United States Patent [19]

Matena et al.

[11] Patent Number: 5,860,153
[45] Date of Patent: Jan. 12, 1999

[54] MEMORY EFFICIENT DIRECTORY COHERENCY MAINTENANCE

[75] Inventors: Vladimir Matena, Redwood City; Jose M. Bernabeu-Auban; Yousef A. Khalidi, both of Sunnyvale; Kenneth W. Shirriff, Mountain View; Moti N. Thadani, Santa Clara, all of Calif.

[73] Assignee: Sun Microsystems, Inc., Mountain View, Calif.

[21] Appl. No.: 562,177

[22] Filed: Nov. 22, 1995

[51] Int. Cl.$^6$ ............................. G06F 13/00; G06F 15/16
[52] U.S. Cl. ...................... 711/216; 395/200.49; 711/144
[58] Field of Search ......................... 395/200.01, 200.09, 395/468, 471, 421.06, 200.3, 200.47, 200.48, 200.49; 711/141, 144, 216

[56] References Cited

U.S. PATENT DOCUMENTS

| | | | |
|---|---|---|---|
| 4,887,204 | 12/1989 | Johnson et al. | 707/10 |
| 5,151,989 | 9/1992 | Johnson et al. | 707/10 |
| 5,265,245 | 11/1993 | Nordstrom et al. | 707/8 |
| 5,434,914 | 7/1995 | Fraser | 379/219 |
| 5,495,608 | 2/1996 | Antoshenkov | 707/3 |
| 5,537,574 | 7/1996 | Elko et al. | 711/141 |
| 5,581,704 | 12/1996 | Barbara et al. | 711/141 |
| 5,604,882 | 2/1997 | Hoover et al. | 711/121 |

OTHER PUBLICATIONS

Wirth, Niklaus. Algorithms +Data Structures =Programs. pp. 264–274, 1976.

Chaiken, D. et al. "Directory–Based Cache Coherence in Large–Scale Multiprocessors", Computer, IEEE, pp. 49–58, Jun. 1990.

Su, Ching–Long et al. "A Study of Cache Hashing Functions for Symbolic Applications in Micro–Parallel Processors", Proceedings of the 1994 Internation Conference on Parallel and Distributed Systems, pp. 530–535, Jun. 1994.

*Primary Examiner*—Tod R. Swann
*Assistant Examiner*—Conley B. King, Jr.
*Attorney, Agent, or Firm*—Blakely Sokoloff Taylor & Zafman

[57] ABSTRACT

A bit map is maintained by a provider object of a name server to keep track of names cached by a cache object of the client. The bit map is indexed by performing a hash of the name. When a name is looked up by the server on behalf of a client, the server hashes the name, and sets the bit in the bit map indexed by the result of the hash modulo the size of the bit map. The result of the hash is returned to the client and is stored with the entry in the cache. A bit "set" in the bit map indicates that the client caches at least one name that hashes into the bit. When the server invalidates a name, a hash of the name to be invalidated is used to find the corresponding bit in the bit mask. If the bit is set, the server sends an invalidation request to the client. The invalidation request includes the result of the hash, and the size of the provider's bit map. The client invalidates all entries that hash into the specified bit in the bitmap on the server. Alternatively, the invalidation request also includes the name to be invalidated and the client invalidates only the entry that matches the name.

20 Claims, 5 Drawing Sheets

MEMORY EFFICIENT DIRECTORY COHERENCY MAINTENANCE

BACKGROUND OF THE INVENTION

1. Field the Invention

The present invention relates to the field of computer systems. More specifically, the present invention relates to directory caching in a distributed computer system.

2. Art Background

Operating systems spend significant time performing path name lookups to convert symbolic path names to file identifiers. In order to reduce the cost of name lookups, many systems have implemented name caching schemes.

Name lookup is an even larger problem in distributed systems, where a client machine may have to contact a file server across a network to perform the name lookup. Typically network file systems cache naming information on client workstations as well as on servers. This allows clients to perform most name lookups without contacting the server, thereby improving lookup speed by as much as an order of magnitude. In addition, client-level name caching reduces the load on the server and the network.

Distributed systems with a large number of workstations have a number of characteristics that can interfere with name caching. In a distributed environment, name caches on different machines must be kept consistent. This results in extra network messages and cost that is not required on a single time-shared system.

In a distributed environment, a very important overhead is the communication time involved in server requests. The actual operations on the server often take less time than the basic network communication. Name caching schemes typically require a separate server request for every component that is not in the name cache of the client, and typical path names contain several components. In contrast, a system without name passing can pass the entire path name to the server in a single operation (i.e., there can never be more than one server request per lookup). This means that an individual lookup operation can take substantially longer with a client-level cache than without one.

A name cache is usually accompanied by a separate cache of file attributes such as permissions, file size, etc. The attributes in the attribute cache are typically managed separately from entries in the name cache, resulting in additional server requests.

Some implementations of name caching use a whole-directory approach, meaning that they cache entire directories. This approach may not work well with load-sharing techniques where a single user spawns processes on several machines simultaneously. If those processes work in a single directory then there may be a substantial amount of overhead required to keep the cached directory consistent on the multiple machines. Similarly, highly shared directories such as the UNIX /tmp directory can also add to the overhead of maintaining cache consistency.

In a distributed system that provides access to remote directories, there is a need to maintain the names contained in the directories in a coherent fashion. Most name servers implement coherent caching using expiration timers. In such a scheme, the client can cache an entry only for a time interval T. The client either must renew the entry before the interval expires, or the entry must be discarded from the cache. When a server passes an entry to a client for caching, the server, in effect, makes a promise not to delete the entry on the server in the next T seconds.

Although the algorithm is easy to implement, it is not applicable for systems that need to create and delete entries very frequently. A UNIX directory is an example of a name server that cannot use such scheme because many files can be created or deleted each second, making caching based on expiration times a poor strategy. Systems that frequently create and delete entries cannot use the expiration timer based algorithms and must employ more complicated coherence protocols. Such protocols typically involve two-way communication between the client and server. This communication can be represented by a pair of objects called "provider" and "cache". The "provider" object on the server side handles the name lookup, creation, and deletion requests initiated by the client. The cache object on the client side responds to invalidate requests initiated by the server.

Typical solutions require memory storage at the server that is proportional to the number of directories (or even worse, proportional to the number of directories multiplied by the number of names in those directories). In the prior art, the server maintains perfect knowledge about each name that is looked up by each client and sends invalidates when need be on a per-name basis. This approach is not readily scalable, and can break down for large systems. That is, as a network becomes increasingly large, the amount of memory required to maintain directory coherency using perfect knowledge of the system becomes prohibitive. At the same time, directory coherency must be maintained if a single system image of the large system is to be preserved.

Thus, for a large system, a typical straightforward directory coherence scheme requires using a prohibitively large amount of memory to store information used to maintain the coherency. It is desirable, however, to maintain the correctness criterion of coherent access to directories for these large systems, but at the same time to reduce memory requirements over previous solutions.

SUMMARY OF THE INVENTION

A data structure such as a bit map is maintained by a provider object of a name server to keep track of names cached by a cache object of a client. The bit map is indexed by performing a hash of the name. When a name is looked up by the server on behalf of a client, the server hashes the name, and sets the bit in the bit map indexed by the result of the hash modulo the size of the bit map. The result of the hash is returned to the client and is stored with the entry in the cache.

A bit or the hash indicator "set" in the bit map indicates that the client caches at least one name that hashes into the bit. When the server invalidates a name, a hash of the name to be invalidated is used to find the corresponding bit in the bit map. If the bit is set, the server sends an invalidation request to the client. The invalidation request includes the result of the hash, and the size of the provider's bit map. The client invalidates all cached entries that hash into the specified bit in the bit map on the server.

Alternatively, the provider includes the name to invalidate in the invalidation request. The cache removes the name and sends back an indication if there are other names in the cache that map to the same bit. The provider clears the bit only if the cache indicates that no other cached entries map to the bit.

The size of the bit map is configurable such that the bigger the map, the more memory is used, but the lower the chance of invalidating additional entries, or sending an invalidation request when the client does not cache the entry.

This solution uses less memory than a conventional solution while maintaining coherency. Furthermore, the amount of memory used can be changed dynamically to select an optimal amount of memory for the bit map based on the number of entries in the directory.

The client does not need to be of the same CPU architecture as the server and the hashing function used on the server does not need to be known by the client.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus for maintaining directory cache coherence is described. In the following description, for purposes of explanation, numerous details are set forth such as specific bit values, message paths, word sizes, etc., in order to provide a thorough understanding of the present invention. It will be apparent, however, to one skilled in the art that such specific details are not essential to the practice of the present invention. In particular, although the present invention will be described within a specific client and server system, it will be appreciated that the present invention is in no way limited to this particular system. As will be appreciated, the present invention finds application in any system requiring maintenance of directory cache coherence. In the description which follows, reference will be made to figures in which well known electrical structures and circuits are shown in block diagram form in order not to obscure the present invention unnecessarily.

Figure 1:
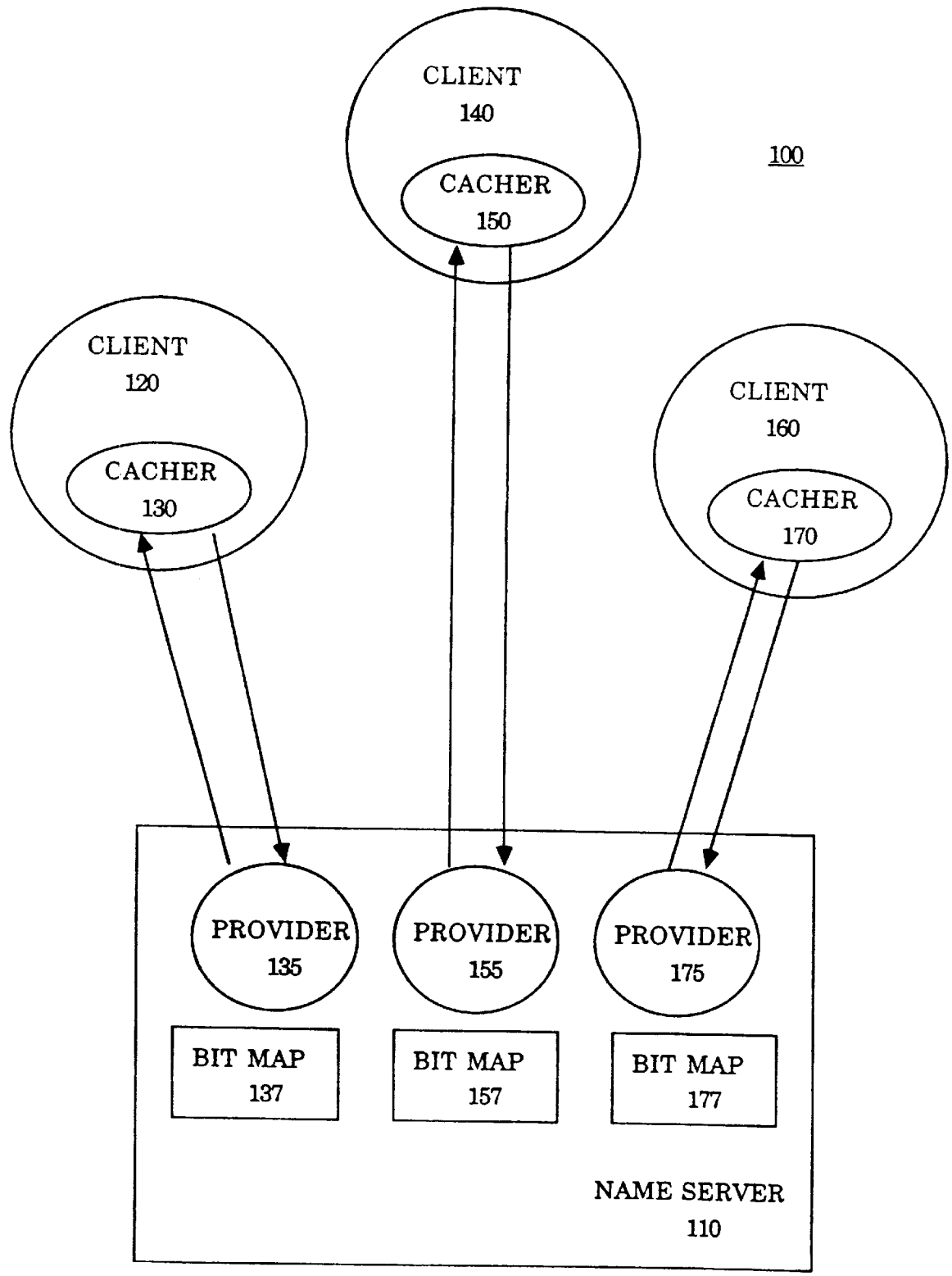
FIG. 1 illustrates a system that provides directory coherence through use of a bit map-based name server.

FIG. 1 illustrates a system that provides directory coherence through use of provider objects using bit maps (data structures). Name server 110 provides directory coherency for clients 120, 140 and 160 of system 100 through the use of cache and provider object pairs. Thus, cache object 130 of client 120 operates in conjunction with provider object 135 of name server 110. Similarly, cache object 150 of client 140 operates in conjunction with provider object 155 and cache object 170 of client 160 operates in conjunction with provider object 175.

Each provider object of server 110 has a corresponding bit map that is used to keep information regarding object names cached by the cache of the provider. Thus, bit map 137 is maintained by provider object 135 to keep information regarding object names cached by cache 130. Similarly, bit map 147 is maintained by provider object 145 to keep information regarding object names cached by cache object 140 and bit map 177 is maintained by provider object 175 to keep information regarding object names cached by cache object 170.

A hash function is applied to an object name to form an index to bit maps 137, 157 or 177. The hash function receives an object name and returns an integer that is uniformly distributed over a range 0 through MAX−1, where MAX is some large integer number. MAX must be as large as the size of the maximum bitmap to be used.

When an index is to be determined, the operator modulo the size of the bit map is used to calculate the index:

index=hash (name) modulo bitmap$_{13}$ size.

When a lookup by client 120 of an object name to be cached by cache object 130 is made to name server 110, provider object 135 hashes the object name, and sets a bit of bit map 137 indexed by the result of the hash. For one embodiment, a bit (hash indicator) is set by giving it the value "1" and reset (or cleared) by giving it the value "0". Alternately, a bit can be set by giving it the value "0" and reset (or cleared) by giving it the value "1".

Note that the indexed bit of bit map 137 may already be set. This can occur because a different object name in the directory has been looked up and the different object name also hashes to the same index.

Similarly, when a lookup by client 140 of an object name to be cached by cache object 150 is made to name server 110, provider object 155 hashes the object name, and sets a bit of bit map 157 indexed by the result of the hash. Also, when a lookup by client 160 of an object name to be cached by cache object 170 is made to name server 110, provider object 175 hashes the object name, and sets a bit of bit map 177 indexed by the result of the hash.

When invalidating an object name, the same hash is again applied to the name to be invalidated to find the corresponding bit in each bit map 137, 157 and 177. If the resulting bit is set, an invalidate command is set to the cache that is associated with the provider that has the bit set. After a response from the invalidate command is received by the provider, the bit in the bitmap is cleared. When client 120, 140 or 160 receives a request to invalidate a cached object name, their respective cache object 130, 150 or 170 invalidates all cached object names that hash to the to-be-cleared bit on the provider.

Note that an optimized implementation of the protocol usually avoids sending invalidation requests to the client that originated the invalidation. The originating client is responsible for the removal of the name from its local cache. For example, if client 120 wants to remove a name from the name server, the client sends the remove request to provider 135. Provider 135 performs the described invalidation protocol on all other providers (155 and 175). When client 120 receives a reply from the remove request, client 120 removes the name from its local cache 130.

Alternately, rather than sending the hash index to a client with the invalidate command, the invalidate command from server 110 includes the object name that is to be invalidated, in addition to hash result and bitmap size. In such a case, clients 120, 140 and 160 need only invalidate a cached object name if the cached object name corresponds to the name to be invalidated. This has the benefit that cached names that hash to the same index, but are not the same as the name to be invalidated, will not be invalidated. Therefore, these names will remain available in the cache. Note that if a client is caching a name that hashes to the same index as that of the object name to be invalidated, the client must notify server 110 so that the corresponding bit of bit map 137, 157 or 177 will not be reset. This ensures that a later request from a client to invalidate the other object name will cause server 110 to issue an invalidate command for that name when it is hashed to the set bit.

Thus, bit maps 137, 157 and 177 are used to relax the requirement that server 110 maintain perfect knowledge about each name that is cached by each client 120, 140 and 160. Therefore, a less accurate picture of cached names is maintained by server 110 and a resulting memory savings is achieved. Note, however, that server 110 still maintains cached names in a coherent fashion, there is no sacrifice of correctness. The bit mapped solution may generate more false invalidate messages than solutions that maintain perfect knowledge at server 110. By configuring the amount of memory used in the data structure of bit maps 137, 157 and 177, however, the probability of extra messages can be made as small as is required. As the size of a bit map is increased, more memory is used, but the chance of a false invalidate is lessened. This is because, on average, fewer names will hash to the same bit of the bit map.

Even in the worst case wherein the bit map is so large that every object name maps to a different bit of the bit map, the bit map solution uses much less memory than a conventional solution. This is because information regarding caching for each object name takes at most a single bit of memory. In a conventional solution, each object name is stored by the server and requires several bytes to store. For example, in the case where each object name can be up to ten characters long, storage of each object name would require at least ten bytes (i.e., 80 bits). Therefore, if ten-character object names are permitted, the worst case bit mapped solution represents a memory savings of between one and two orders of magnitude over the conventional approach. At the same time the bit mapped approach maintains complete directory coherency and performs comparably to the conventional approach.

For one embodiment, the size of the bit map is dynamically configurable. The server can change the size of bitmap during operation without notifying the client. Typically, the size is doubled, or reduced to half. The bigger the map, the more memory is used, but the lower the chance of a false invalidate command. Thus, by making the bit map size configurable, one can tune the directory lookup system to meet the specific needs of a particular system. In the case where conserving memory is paramount, a small bit map can be used. The use of a small bit map comes at the expense of decreased system performance, however, due to a possibly large amount of false invalidate commands being issued. On the other hand, in the case where system performance is paramount, a large bit map can be used. This will increase memory required to provide coherent directory caching, but will decrease (or possibly eliminate) the occurrence of false invalidate commands.

For one embodiment each bit map 137, 157 and 177 of server 110 has the same sized. In this case, a single hash for a name can be performed by server 110 and then the resulting hash index can be used by provider objects 135, 155 and 175 to index bit map 137, 157 and 177, respectively. Alternately, one or more of the bit maps of server 110 can have a different size than the other bit maps. This may result in the same name hashing to different bits within the different sized bit maps. In such a case, hashing is performed by each provider object, rather than a single hash being performed by the server 110.

For another embodiment, each of clients 120, 140 and 160 is located on a different node of a computer network. For this embodiment, each node of network 100 can be a single processor computer, a co-processor computer or a multiple computer system. In the case wherein a node is formed from multiple computers, the computers can be of the same type, or the node can be formed from two or more types of computers.

Alternately, two or more clients of clients 120, 140 and 160 can be located on the same node of a network, or on the same computer. Thus, in general a client and server do not have to be on different nodes. For example, two or more clients could be on the same computer, or node, with each client corresponding to a different program, and each of the different programs having its own address space that is different from the address space of the other programs.

For one embodiment a system 100 uses the Solaris operating system and hashing is implemented using a program written in the C++ computer language. The following hashing algorithm is used for this embodiment:

```
//
// Hash a name. The function was taken from "Aho A., Sethi R., Ullman J.
// Compilers - principals, techniques, and tools. Addison-Wesley 1985,
// page 436".
// u_long
pxfslib::hashpjw (const char *nm)
{
        int        len = os::strlen (nm);
        u_long     h = len;
        u_long     c;
        for (u_char *p = (u_char*) nm; (c = *p) ! = '\0'; p++) {
                u _int g;
                h = (h << 4) + c;
                if ((g = (h & 0xf0000000)) ! = 0) {
                        h ^ = (g >> 24);
                        h ^ = g;
                        {
                {
                return (h % 65599 + h % 211);
{
```

Alternately, another operating system, another computer language, or even another hashing scheme can be employed.

Figure 2:
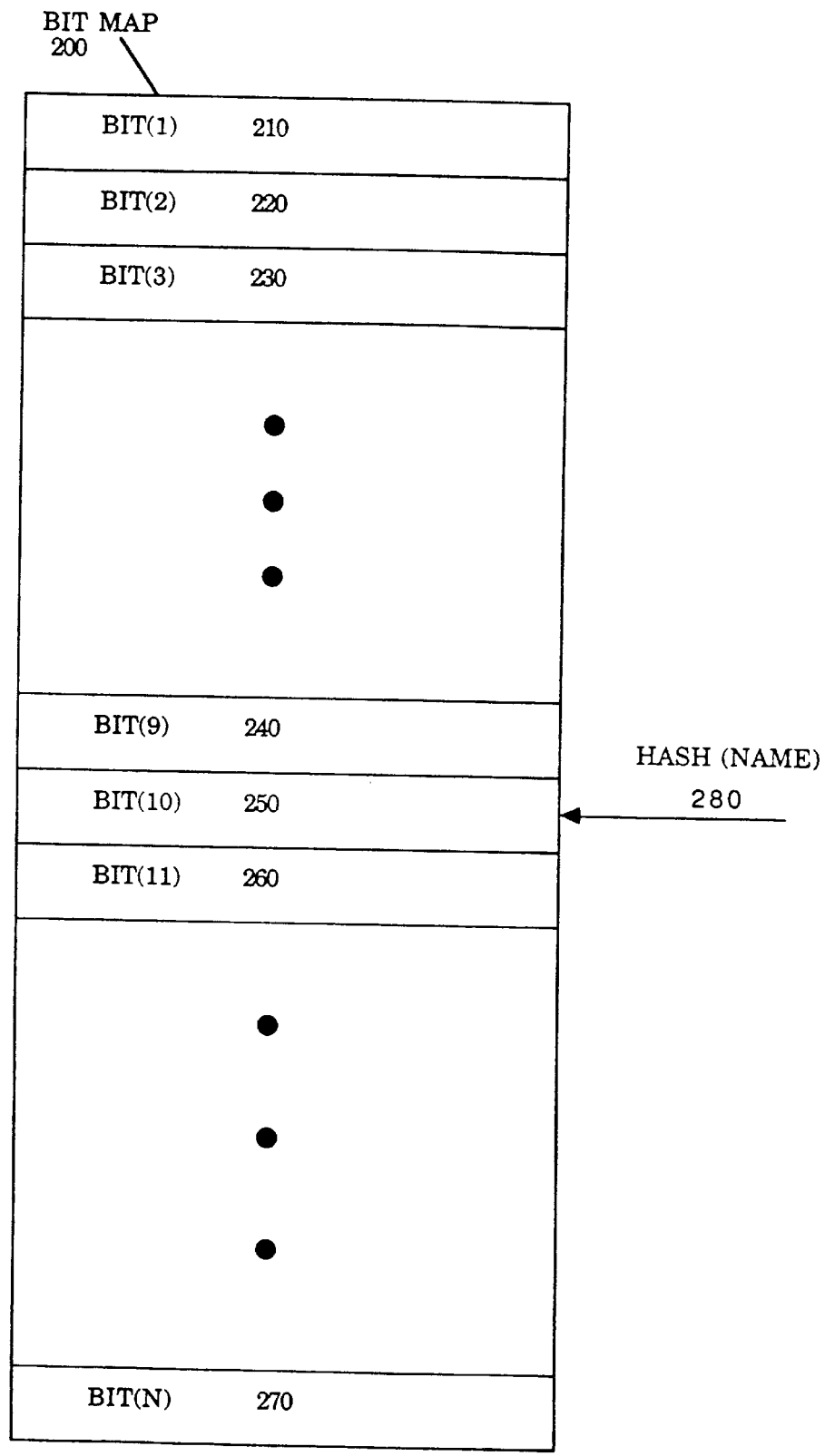
FIG. 2 illustrates a bit map having N bits that is used by a provider of the bit map-based name server.

FIG. 2 illustrates a bit map having N bits that is used by a provider of the bit map-based name server. Thus, bit map 200 includes bit (1) 210, bit (2) 220, bit (3), 230, . . . bit (9) 240, bit (10) 250, bit (11) 260, . . . and bit (N) 270. Each bit of bit map 200 is initially cleared.

When a name is looked up to be added to a cache, a hash of the name is performed, operator modulo bitmap size is applied, to yield an index into bit map 200. The particular bit indexed is then set to indicate that the name has been added to the cache. Thus, for example, HASH (NAME) 280 indexes into bit (10) 250 of bit map 200. Therefore, bit (10) 250 would be set when NAME was looked up and added to the cache associated with bit map 200.

Figure 3:
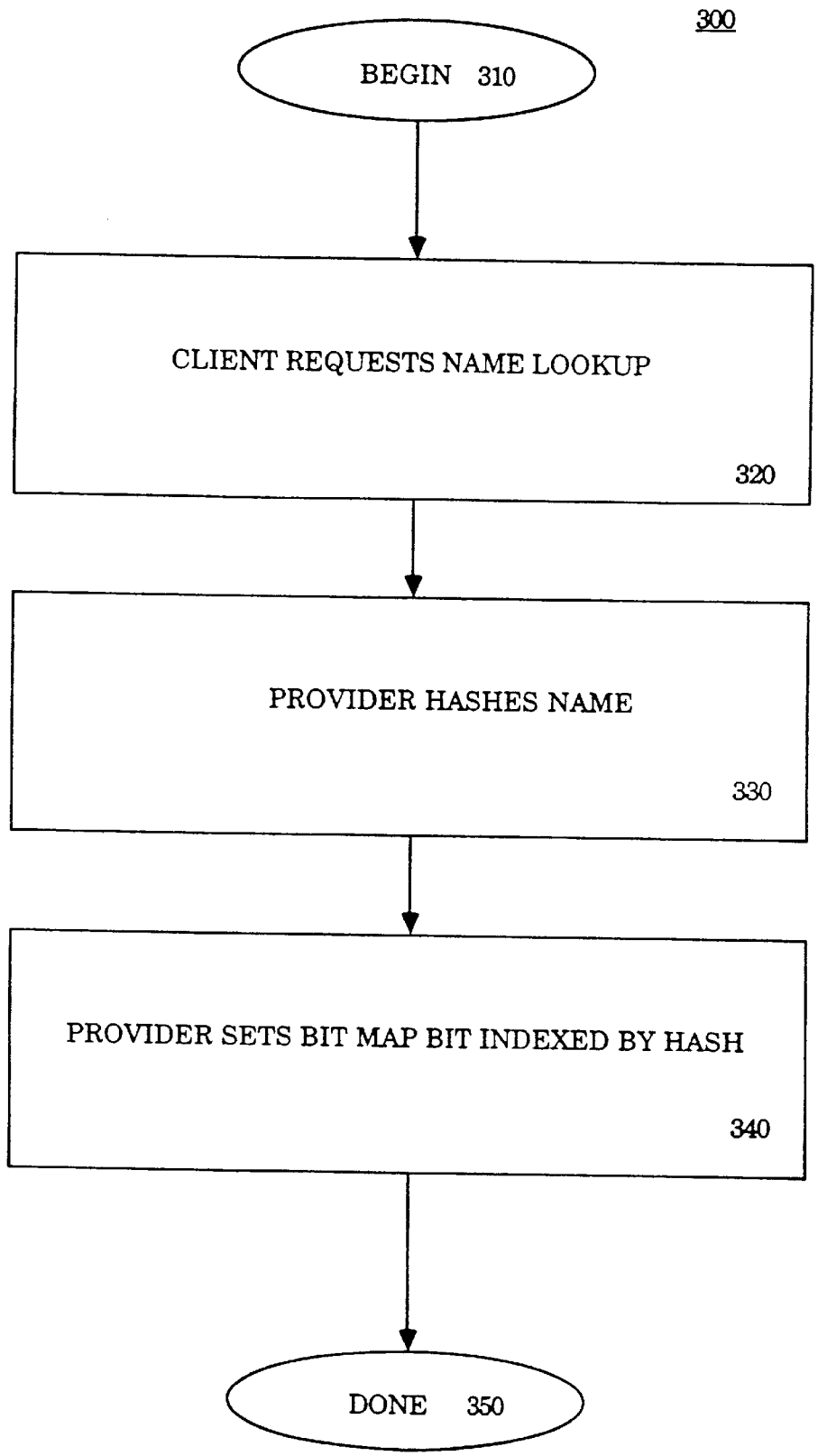
FIG. 3 illustrates a bit map bit being set by the provider during a cache-originated directory lookup.

FIG. 3 illustrates a bit map bit being set by the provider during a cache-originated directory lookup. Procedure 300 begins at bubble 310. In block 320, the client requests a name lookup. The provider hashes the name in block 330. The provider then sets the bit map bit indexed by the hash in block 340 before finishing in bubble 350.

Returning to FIG. 2, if an invalidate request is made for NAME, a second hashing will be performed. HASH (NAME) 280 will again index into bit (10) 250 of bit map 200. Bit (10) 250 was previously set to indicate that NAME was looked up and added to the cache associated with bit map 200. Therefore, because bit (10) 250 is set, an invalidate command is then be issued to cause NAME to be removed from the cache associated with bit map 200. Upon notification that the invalidation has occurred, bit (10) 250 is reset.

Figure 4:
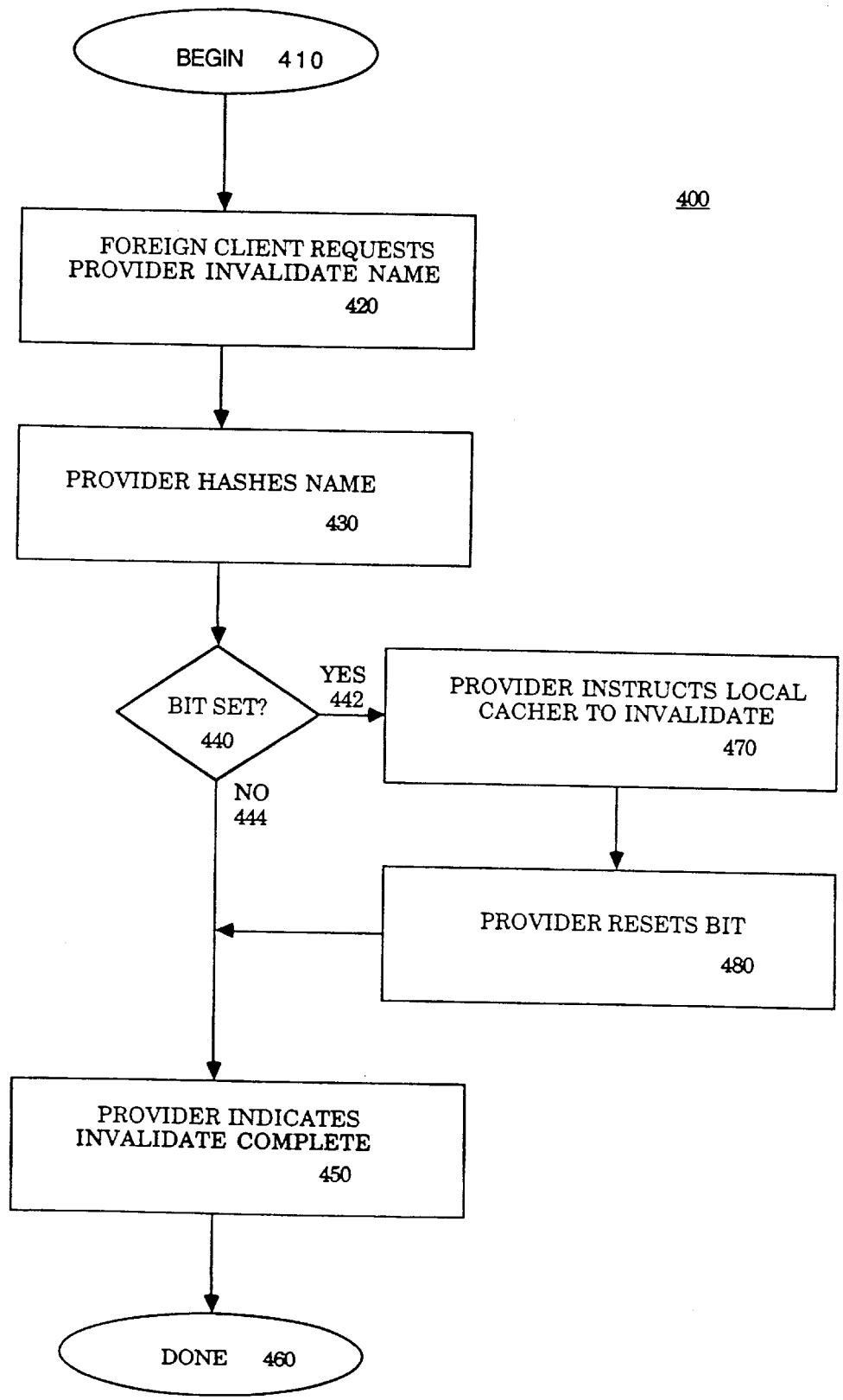
FIG. 4 illustrates the provider side of an object name invalidate operation that has been originated by an object name invalidate request issued to the provider by a foreign client; and, FIG. 5 illustrates response by a cache to an object name invalidate command that has been issued by the provider as a result of the object name invalidate operation of the foreign client.

FIG. 4 illustrates the provider side of an object name invalidate operation that has been originated by an object name invalidate request issued to the provider by a foreign client. Procedure 400 begins at bubble 410. In block 420, a foreign client requests that the provider cause its associated cache to invalidate a name cached therein. The provider hashes the name in block 430. The provider then determines in decision block 440 whether or not the bit map bit indexed by the hash of block 430 has been set. If the bit has not been set, then the cache does not contain the name to be invalidated. In such a case, path NO 444 is taken to block 450 where the provider indicates that the invalidation is complete before finishing in bubble 460.

On the other hand, if the bit has been set, then the cache may contain the name to be invalidated. In such a case, path YES 442 is taken to block 470 where the provider instructs the associated cache, i.e., the cache object associated with the provider, that an invalidate may be required. For one embodiment, the cache invalidates each cached name that hashes to the set bit and then informs the provider that the invalidation has been performed. For this embodiment, each cached name that hashes to the set bit is stored in the same "bucket", e.g., a linked list. This makes it possible for the cache to efficiently locate and invalidate each cached name that hashes to the set bit. The provider then resets the bit in block 480, before proceeding to block 470. As was the case previously, the provider indicates in block 470 that the invalidation is complete before finishing in bubble 460.

Note that in an alternate case, the particular name to be invalidated will be specified to the cache by the provider. Then, in block 470, rather than invalidating each cached name that hashes to the set bit, the cache will only invalidate the cached name specified by the provider (if this name is stored in the cache). The cache will indicate to the provider whether any other names that hash to the same index as the name to be invalidated are also cached. In this case, the provider will only reset the bit in block 480 if there are no other names that are still stored in the cache that hash to the same bit.

Figure 5:
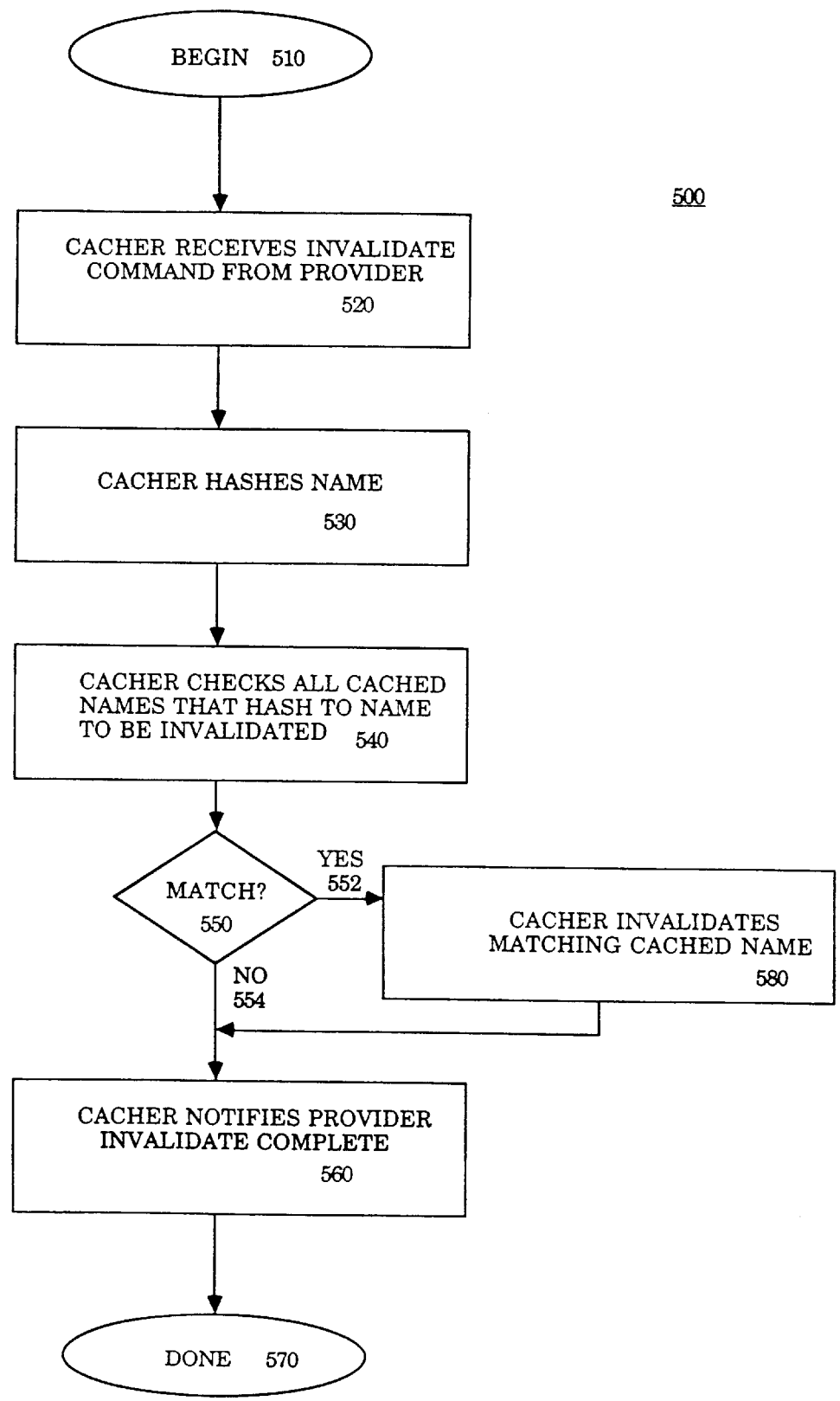

FIG. 5 illustrates response by a cache to an invalidate command that has been issued by the provider as a result of the object name remove operation of another client. Procedure 500 begins at bubble 510. In block 520, the cache receives an invalidate command from its associated provider. The command contains the hash result on the name to be invalidated and the size of the providers bit mask. In block 540, the cache uses the hash result to locate all the cached names that map into the specified bit. All names that map to the specified bit are invalidated from the cache in block 540. The control then moves directly to block 560 through path 551. In block 560 the cache sends a response to the provider informing that all entries that map to the specified bit has been removed. Blocks 550 and 580 are not used in this path.

Alternately the invalidation request includes the name to be invalidated. In block 540 the cache finds all cached entries that map into the specified bit. Then decision block 550 is applied to all the entries found in block 540. In decision block 550, each entry is compared to the name to be invalidated. If the name matches, the path YES 552 is taken. In block 580, the matching entry is removed from the cache. If the name does not match in block 550, it is not removed from the cache. Block 550 is applied until all entries found in block 540 are processed. Then path DONE 556 to block 560 is taken. The message sent to provider in block 560 includes the indication whether the cache still has other entries that map to the specified bit. The presence of other entries was determined during the processing done in blocks 540, 550, and 580.

Although the present invention has been particularly described with reference to FIGS. 1 through 5, it should be understood that these figures are for illustration only and should not be taken as limitations upon the invention. Furthermore, although the present invention has been described as being advantageously implemented to provide directory coherence in distributed networks, the above described bit map-based client and server object approach can be utilized to maintain information coherency across any boundaries. It is further contemplated that many changes and modifications may be made to the invention, by one of ordinary skill in the art, without departing from the spirit and scope of the invention as disclosed herein.

What is claimed is:

1. A directory coherence mechanism for use in a client-server system having a server and a plurality of clients, said mechanism comprising:

a cache configured to store name information; and a name server configured to provide the name information to the cache, the name server having a data structure and setting a hash indicator of the data structure when providing the cache name information of a particular object name, the hash indicator having a hash index calculated by hashing the particular object name, wherein if the name server receives a directory invalidate request for a name to be invalidated, the name server hashes the name to be invalidated and if a data of the data structure indexed by the hash of the name to be invalidated has been set, the name server orders the cache to invalidate all cached name information associated with the data indexed by the hash of the name to be invalidated and the name server resets the data indexed by the hash of the name to be invalidated.

2. The directory coherence mechanism as set forth in claim 1, wherein the cache indicates to a name server cache when all cached object name information associated with the data indexed by the hash of the name to be invalidated has been invalidated.

3. The directory coherence mechanism as set forth in claim 2, wherein the name server indicates a successful invalidation after the cache has indicated to the name server that all of the cached name information associated with the data indexed by the hash of the name to be invalidated has been invalidated.

4. The directory coherence mechanism as set forth in claim 1, wherein the name server indicates a successful invalidation if the name server hashes the name to be invalidated and the data of the data structure indexed by the hash of the name to be invalidated has not been set.

5. The directory coherence mechanism as set forth in claim 1, wherein if the name server receives a directory invalidate request for a name to be invalidated, the name server hashes the name to be invalidated and, if a data of the data structure indexed by the hash of the name to be invalidated has been set, the name server orders the cache to invalidate cached name information associated with the name to be invalidated, then, if the cache indicates that the cached name information associated with the name to be invalidated has been invalidated, the name server resets said data indexed by the hash of the name to be invalidated only if there are no other cached entries mapping to the same data.

6. The directory coherence mechanism as set forth in claim 5, wherein the cache indicates to the name server when the cached name information associated with the name to be invalidated has been invalidated and when no name information associated with the name has been cached.

7. The directory coherence mechanism as set forth in claim 6, wherein the name server indicates a successful invalidation after the cache has indicated to the name server that the cached name information associated with the name to be invalidated has been invalidated.

8. The directory coherence mechanism as set forth in claim 5, wherein the name server indicates a successful invalidation if the name server hashes the name to be invalidated and the data of the data structure indexed by the hash of the name to be invalidated has not been set.

9. The directory coherence mechanism as set forth in claim 5, wherein said data structure is a bit map, said data is a bit and said hash indicator is a hash bit.

10. A method for maintaining directory coherence, comprising the steps of:

caching name information;

providing the name information from a name server to a cache, the name server having a data structure and setting a hash indicator of the data structure when providing the name information of a particular name, the hash indicator having a hash index calculated by hashing the particular name;

hashing the name to be invalidated, said hashing performed by the name server, if the name server receives a directory invalidate request for a name to be invalidated; and if a data of the data structure indexed by the hash of the name to be invalidated has been set, said method ordering the cache to invalidate all cached name information associated with said data indexed by the hash of the name to be invalidated and resetting the data indexed by the hash of the name to be invalidated, said ordering performed by the name server.

11. The method as set forth in claim 10, wherein if the name server receives a directory invalidate request for a name to be invalidated, further comprising the steps of:

hashing the name to be invalidated, said hashing performed by the name server;

if a data of the data structure indexed by the hash of the name to be invalidated has been set, said method ordering the cache to invalidate all cached name information associated with the data indexed by the hash of the name to be invalidated, said ordering performed by the name server; and resetting a bit indexed by the hash of an object name to be invalidated, said resetting performed by the name server.

12. The method as set forth in claim 11, further comprising the step of:

indicating to the name server when all cached name information associated with the data indexed by the hash of the name to be invalidated has been invalidated, said indicating performed by the cache.

13. The method as set forth in claim 12, further comprising the step of:

indicating a successful invalidation after the cache has indicated to the name server that all of the cached name information associated with the data indexed by the hash of the name to be invalidated has been invalidated, said indicating performed by the name server.

14. The method as set forth in claim 11, further comprising the step of:

indicating a successful invalidation if the name server hashes the name to be invalidated and the data of the data structure indexed by the hash of the name to be invalidated has not been set, said indicating performed by the name server.

15. The method as set forth in claim 10, wherein if the name server receives a directory invalidate request for a name to be invalidated, the method further comprises the steps of:

hashing the name to be invalidated;

if a data of the data structure indexed by the hash of the name to be invalidated has been set, ordering the cache to invalidate cached name information associated with the name to be invalidated, said ordering performed by the name server; and then, if the cache indicates that the cached name information associated with the name to be invalidated has been invalidated, resetting a bit hashed for the name to be invalidated, said indicating performed by the name server.

16. The method as set forth in claim 15, further comprising the steps of:

indicating to the name server when the cached name information associated with the name to be invalidated has been invalidated, said indicating performed by the cache.

17. The method as set forth in claim 16, further comprising the step of:

indicating a successful invalidation after the cache has indicated to the name server that the cached name information associated with the name to be invalidated has been invalidated, said indicating performed by the name server.

18. The method as set forth in claim 15, further comprising the step of:

indicating a successful invalidation if the name server hashes the name to be invalidated and the data of the data structure indexed by the hash of the name to be invalidated has not been set, said indicating performed by the name server.

19. The method as set forth in claim 15, further comprising the step of:

keeping the data set if there are entries left in the cache that map to the same data, said keeping performed by the name server.

20. The method as set forth in claim 12 wherein said data is a bit, said data structure is a bit map and said hash indicator is a hash bit.

* * * * *